Sept. 26, 1933.   C. A. BRUNING   1,928,217
PORTABLE SUPPORTING RACK
Filed May 6, 1933
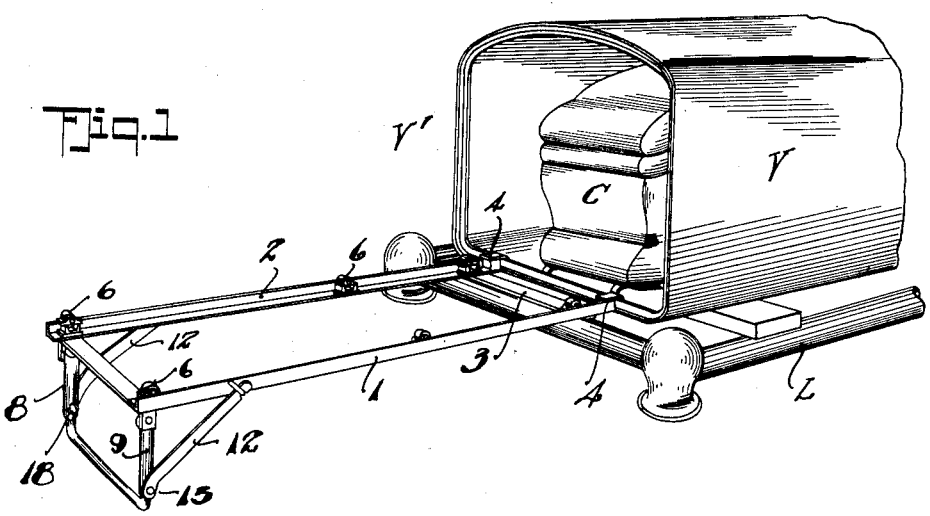
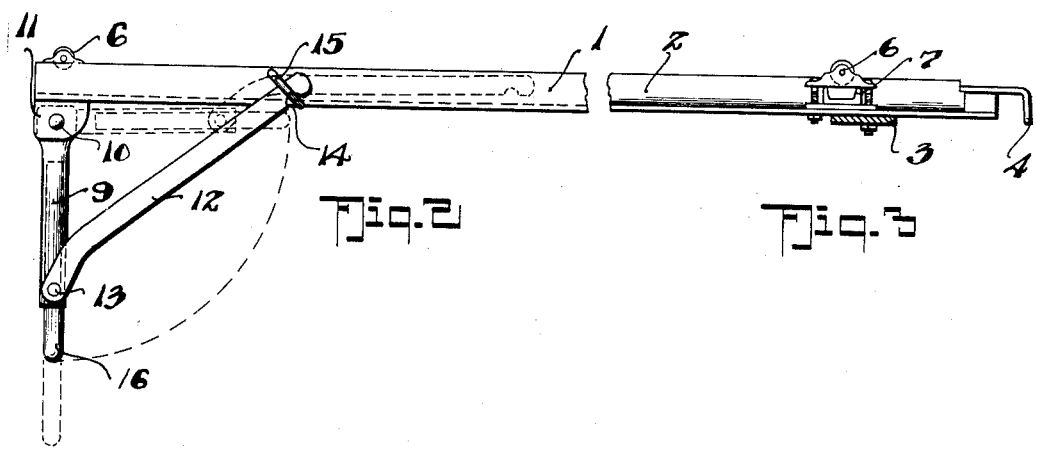
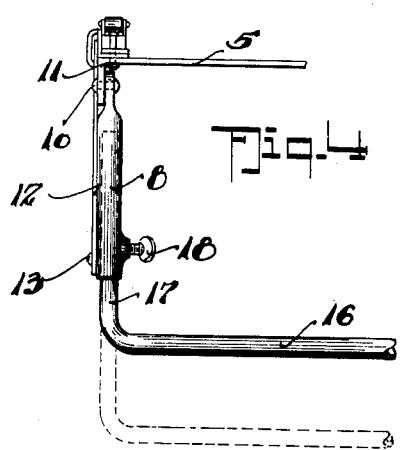
CLARENCE A. BRUNING
Inventor
By Herbert E. Smith
Attorney Patented Sept. 26, 1933

1,928,217

UNITED STATES PATENT OFFICE 1,928,217

PORTABLE SUPPORTING RACK

Clarence A. Bruning, Colfax, Wash.

Application May 6, 1933. Serial No. 669,734

2 Claims. (Cl. 27—26)

My present invention relates to an improved portable supporting rack especially adapted for use as part of the equipment or burial apparatus employed at the grave-side in preparation for insertion of the casket within a concrete, or steel vault, of well known types.

The portable supporting rack of my invention is of the foldable type, employing conveyer rollers for the purpose of shifting the casket from the rack to the interior of the vault, and while I have for convenience illustrated and described the portable supporting rack as part of a burial equipment, it will be understood that the rack is adapted for other uses.

The portable foldable rack of my invention may be folded into compact shape and small size for convenience in transportation, or for storage when not in use; and the parts of the rack may be manipulated with facility and dispatched by a single person. Means are also provided whereby parts of the rack may readily be adjusted to the ground surface and to the vault in order that the casket may be supported in level position before its insertion into the vault. Preferably one end of the rack is adapted for quick attachment to and quick detachment from a support, as for instance the portable vault; and the other end of the rack is provided with legs or supports by means of which the rack is supported from the ground surface.

The invention consists in certain novel combinations and arrangements of parts as will hereinafter be more fully set forth and claimed. In the accompanying drawing I have illustrated one complete example of the physical embodiment of my invention in which the parts are combined and arranged according to one mode I have thus far devised for the practical application of the principles of my invention.

Figure 1 is a perspective view of the burial equipment at a grave-side, showing portions of a vault, and a casket therein, together with the portable supporting rack of my invention ready to be removed from its operative position.

Figure 2 is an enlarged detail side view at the rear end of the rack, showing by dotted lines the vertical adjustment of the supporting leg, and also showing by dotted lines the hinged support in folded position as when out of use.

Figure 3 is a longitudinal vertical sectional view of the front portion of the rack showing one of the attaching hooks for engagement with a portion of the vault.

Figure 4 is a view in rear elevation at the left side of the rack, showing the vertical adjustment by dotted lines.

In order that the general utility of the rack may be readily understood I have shown in Figure 1 a well known type of vault V in which is enclosed the casket C, and the lowering apparatus L is in position to lower the vault and its contained casket into a grave. The vault V is provided with a sealing lip V' and this lip is preferably employed as a means for attaching the rack and temporarily supporting one end of the rack while the casket is supported on the rack and while the casket is being pushed or shifted from the rack into the vault, for burial.

The rack is composed of a practical minimum of parts and includes a rectangular frame made up of two parallel side bars 1 and 2 fashioned from angle irons and of suitable length. At the front of the rack a cross bar 3 is rigidly attached to the side bars, and at the front ends of these side bars a pair of attaching hooks 4, 4, are rigidly mounted. These hooks are adapted to engage the sealing lip C' of the vault in the absence of the end-closure of the vault, and the hooks provide a simple, but reliable means for holding the rack in position with relation to the vault.

In Figure 1 the side bars of the rack are shown resting on one of the end bars of the lowering apparatus, and the vault is elevated above the ground surface. The rack is of course held in level or horizontal position for the reception of the casket, and the end bar of the lowering apparatus as well as the sealing lip C' of the vault, provide an elevated support for the rack, at its front end.

At the rear end of the rack a cross bar 5 joins the ends of the parallel side bars, and it will be apparent that the two side bars and two end bars, rigidly joined, provide a substantial, rectangular, durable, and unostentatious support for the casket preparatory to its insertion into the vault. At the top of the rack three pairs of rollers, as 6, are supported in brackets 7, the rollers projecting slightly above the top edges of the side bars, and above the end bars, for direct contact with the bottom of the casket.

In Figure 1 the casket has been pushed from the supporting rollers, and deposited in the vault.

The rear end of the rack is supported by means of vertically adjustable, foldable, parts, which may readily be swung from folded position and with facility adjusted to position with relation to the ground-surface in order that the rack may stand in its level, stable, position as shown. At each corner of the front end of the rectangular rack I provide a tubular leg, as 8 and 9, and these legs are hinged at 10 to brackets 11, the latter being rigidly attached to the side bars of the rack.

Diagonal brace links 12 are pivoted at 13 near the lower ends of the legs, and the free end of each of these links is provided with a notch 14 to perform the functions of a latch. The free, notched ends of the braces or links pass freely through eyes or loops 15, one located at each of the outer sides of the side bars, and it will be apparent that the notches of the links are adapted to engage against their respective loops or eyes to hold or latch the links in their diagonal bracing positions, as indicated in Figure 2. The notched ends at all times project through the loops, and the loops are of ample size to permit the notched ends to be slipped back from engagement with the eyes to permit folding of the legs parallel with the side bars, and also to permit folding of the pivoted links parallel with the side bars as indicated by dotted lines in Figure 2.

The two tubular, hinged legs are joined by a U-shaped foot-bar 16 that is adapted to rest upon the ground surface, and this foot bar has a pair of end legs 17 that telescope within the pair of tubular legs, the end-legs of course being inserted at the bottom free ends of the two legs. The foot bar joins the two hinged legs to provide a rigid support for the front end of the rack, and the U-shaped foot bar may readily be adjusted by means of its end-legs telescoping in the tubular legs, as indicated in Figure 4, where the U-shaped foot bar and the legs 8 and 9 are rigidly fastened by means of a set bolt as 18.

Because of the minimum number of parts and the simplicity of construction of the rack, it will be apparent that the rack may readily be manipulated and placed in position for use, and with equal facility, after the burial service, the rack may be detached from the vault and its parts folded to compact position for transportation or storage.

Having thus fully described my invention, what I claim as new and desire to secure by Letters Patent is:—

1. The combination with a supporting rack having a pair of front hooks, of a pair of tubular legs hinged at the rear end of the rack, a removable, U-shaped foot bar having telescopic connection with said legs, set bolts mounted in the legs for securing said foot bar, a brace link hinged to the free end of each leg at its outer side, and co-acting means on the rack and on the free ends of said brace links for fastening said free ends to the rack.

2. The combination with a supporting rack having attaching means at its front end, of a pair of tubular legs hinged at the rear end of the rack, a removable, U-shaped, foot bar having telescopic connection with said legs, means mounted on the legs for securing the foot bar in adjusted position with relation to the legs, a brace link hinged to the free end of each leg and a notch at the free end of each brace link, and a pair of supporting loops mounted on the rack to receive the free ends of the brace links.

CLARENCE A. BRUNING.